Figure 1:
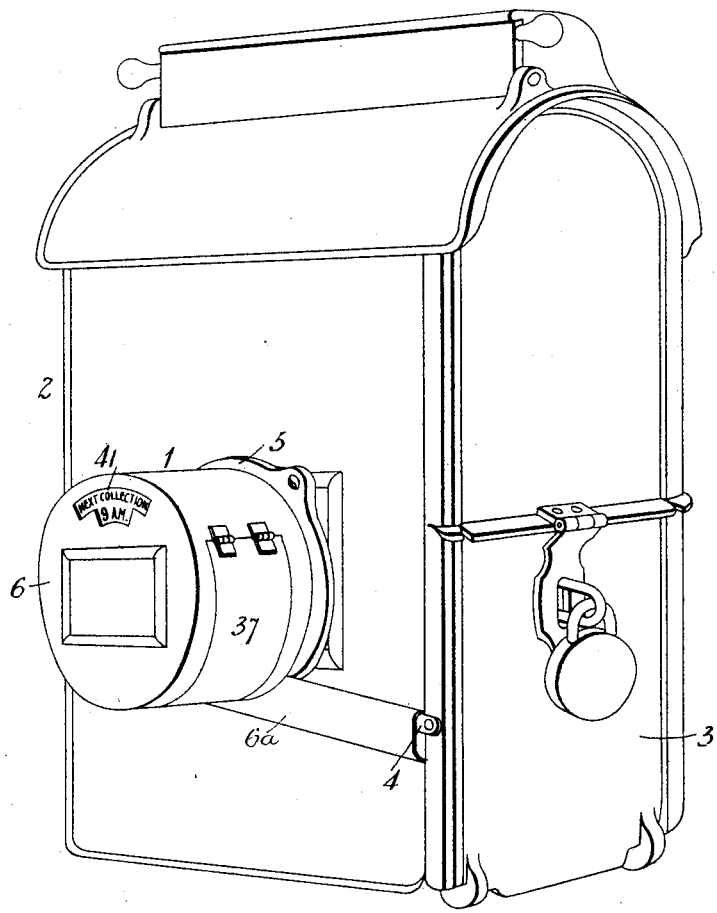

(No Model.)  5 Sheets—Sheet 1.

T. J. HOUCK.
REGISTERING DEVICE.

No. 588,150. Patented Aug. 17, 1897.

Witnesses

Inventor
Thomas J. Houck
By his Attorneys (No Model.)  5 Sheets—Sheet 2.

T. J. HOUCK.
REGISTERING DEVICE.

No. 588,150. Patented Aug. 17, 1897.

Witnesses

Inventor
Thomas J. Houck
By W. W. Dudley & Co.
his Attorneys (No Model.)  5 Sheets—Sheet 3.

T. J. HOUCK.
REGISTERING DEVICE.

No. 588,150.  Patented Aug. 17, 1897.

Witnesses
C. H. McEwen
W. S. Norton

Inventor
Thomas J. Houck
By W. W. Dudley & Co.
his Attorneys (No Model.) 5 Sheets—Sheet 4.
T. J. HOUCK.
REGISTERING DEVICE.

No. 588,150. Patented Aug. 17, 1897.

Witnesses

Inventor
Thomas J. Houck
By M. W. Dudley & Co
his Attorneys (No Model.)

T. J. HOUCK.
REGISTERING DEVICE.

No. 588,150.

5 Sheets—Sheet 5.

Patented Aug. 17, 1897.

Witnesses

Inventor
Thomas J. Houck
By his Attorneys

UNITED STATES PATENT OFFICE.

THOMAS J. HOUCK, OF BALTIMORE, MARYLAND, ASSIGNOR OF ONE-HALF TO W. W. DUDLEY AND L. T. MICHENER, OF WASHINGTON, DISTRICT OF COLUMBIA, AND H. J. TRUESDELL, OF NEW YORK, N. Y.

REGISTERING DEVICE.

SPECIFICATION forming part of Letters Patent No. 588,150, dated August 17, 1897.

Application filed November 27, 1896. Serial No. 613,478. (No model.)

*To all whom it may concern:*

Be it known that I, THOMAS J. HOUCK, a citizen of the United States, residing at Baltimore, State of Maryland, have invented certain new and useful Improvements in Registering Devices; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to recording devices generally, but more particularly to improvements in letter-box recorders or that class of such devices which operate as a check on the letter collector or carrier by recording the number and times of collections of mail-matter.

The object of this invention is the production of a recording device possessing advantages in point of accuracy and infallibility of action, and also of simplicity of construction and durability.

An aim of this invention is to secure to the sender of mail-matter a collection thereof at a certain specified time or the detection of the collector or carrier in the event of his failure to make the collection, as a record will be made at each opening of the letter-box door of the exact time of such operation.

Under the present system of mail-matter collections frequent complaints are made against collectors or carriers for alleged neglect or delays in the collections, which necessitates careful investigations, owing to the difficulty in many instances of obtaining evidence in support of or against the charge. Under the present system also it is possible for a collector or carrier or other person in possession of the key to open a box at a time or times not specified in the times of collection and to then gain possession of the contents for the purpose of theft with little danger of detection.

With this invention irregularities in collections, as well as thefts, are greatly discouraged, as an accurate record of the time of day or night is automatically made of each opening of the box-door, the record fixing the times of collections and showing also, if accomplished, the time of the entry for the purpose of theft.

This invention when applied as described is designed to remedy the evils noted and also to improve the system of mail-matter collections generally by the assurance on the part of the carriers that the records will result not only in proof of neglect, if neglect there be, but also in vindication, if the service has been timely performed.

This invention also provides for the notification to the public of the times of collections, the means employed being actuated through the manipulation of the box-door to disclose to plain view the time of the next following collection.

Other provisions and advantages are present in this invention and are fully set forth in the following description, which is directed to the construction and operation of the improved recording device and which is to be read in connection with the accompanying drawings.

Figure 10:
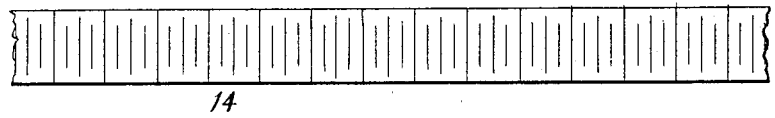
Figure 2:
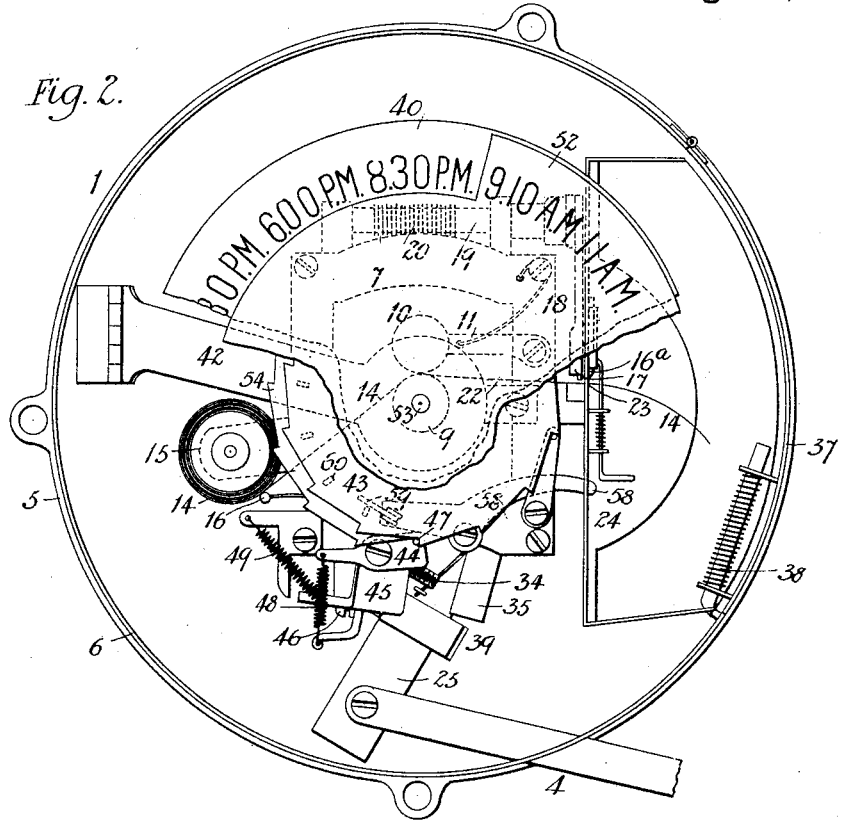
Figure 3:
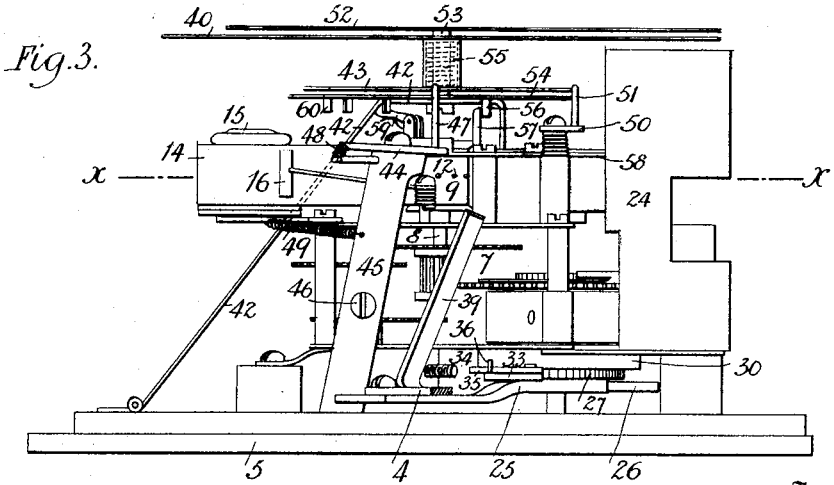
Figure 4:
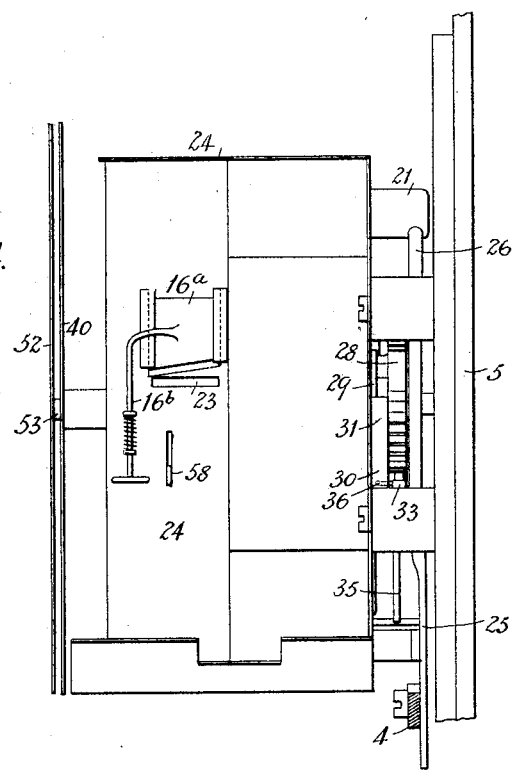
Figure 5:
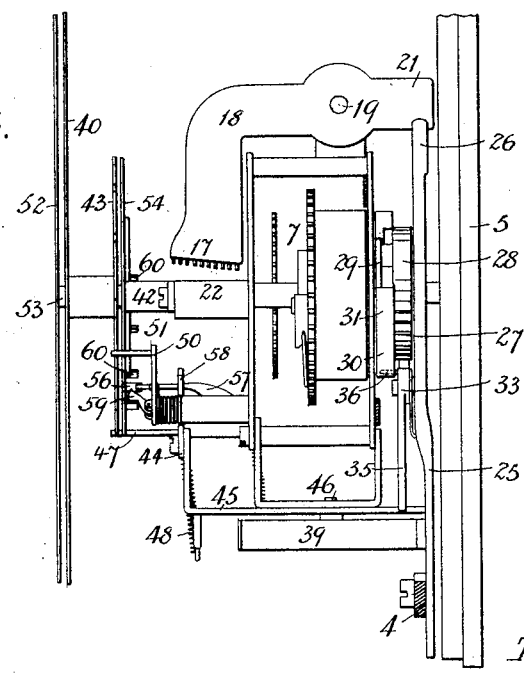
Figure 6:
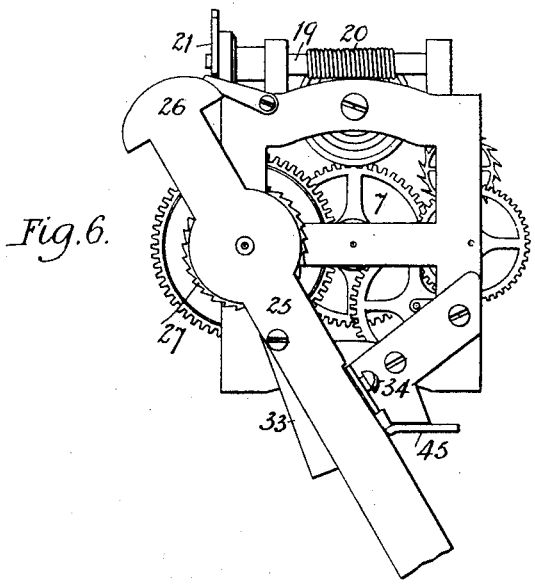
Figure 7:
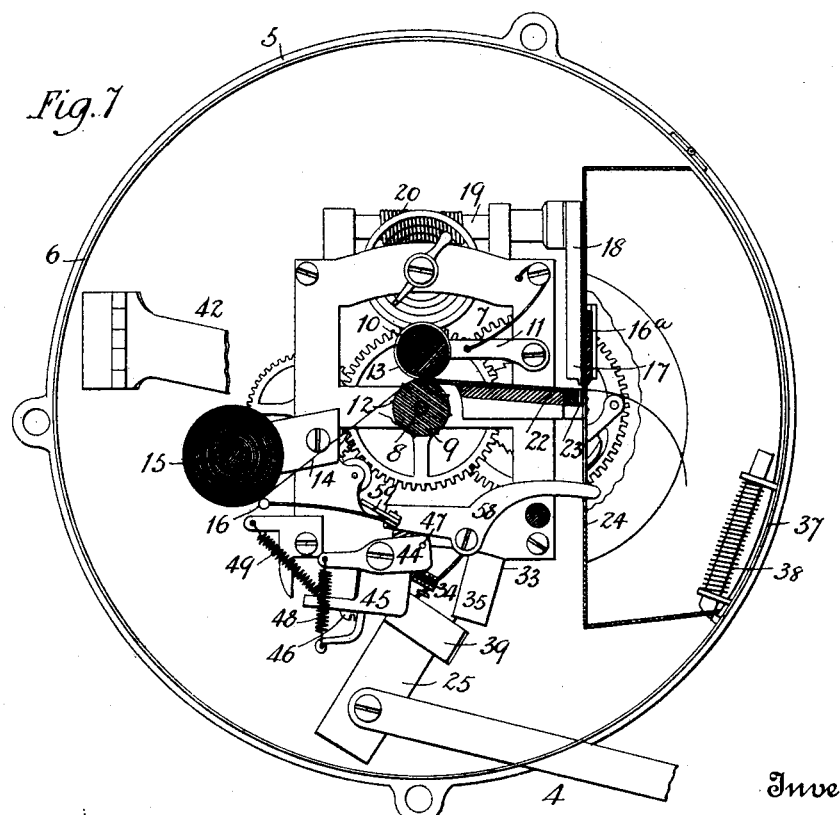
Figure 8:
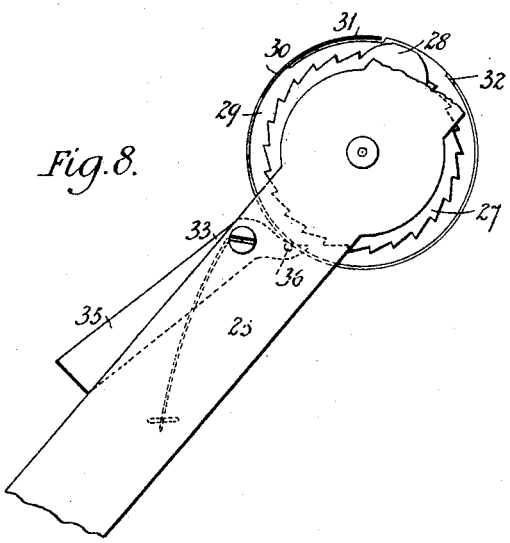
Figure 9:
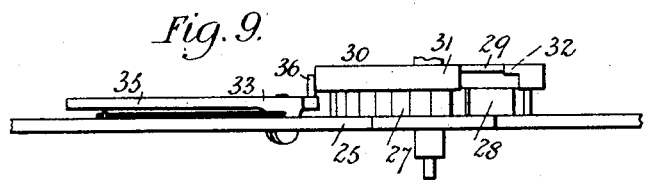

In the said drawings, Figure 1 is a perspective view of my invention as applied to a letter-box. Fig. 2 is an enlarged elevation of the recording device with the cap or cover removed. Fig. 3 is an elevation of the device without its cover viewed from the under side. Fig. 4 is a side elevation of the device without its cover. Fig. 5 is a side elevation with the inner casing-plate removed. Fig. 6 is a rear elevation, the base-plate being removed. Fig. 7 is a sectional view of the device, taken on line $x$ $x$ of Fig. 3. Fig. 8 is an enlarged detail plan view of the winding mechanism. Fig. 9 is an enlarged side elevation of the winding mechanism. Fig. 10 is an enlarged view of a section of the record-tape.

The following is a detailed description of my invention when applied, as shown, to a letter-box or other mail-matter receptacle; but I do not limit myself to such application, as my invention is susceptible of embodiment in any analogous device where the registration or record of an act is desired.

Referring to the said drawings by figures, 1 denotes my improved recording device, which when employed for the purpose of recording collections of mail-matter is secured on the exterior of a letter-box, such as 2. The device and all of its parts are entirely without or on the exterior of the box, which arrangement precludes of interference with the mail-matter and in no way hampers the collector. The pivoted door 3 of the letter-box, by which access is had to the interior, has a connection with the recording device, preferably in the nature of a rod 4, pivotally secured at one end to a point on the door which will insure a sufficient range of movement thereto when the door is manipulated, while the other end is pivotally secured to a lever in the recording device, which actuates through the movement of the door the recording and other mechanisms.

The recording device is contained within a protective casing consisting of a back plate 5, to which the parts are secured, and a cap-piece or cover 6, which incloses the parts; and, if desired, and as shown, the cap-piece or cover may be extended, as at $6^a$, to inclose the rod 4 and thereby to preclude its being tampered with by malicious persons. The casing is preferably so constructed as to exclude dust and moisture, and its outer surface is enameled or otherwise protected.

The recording mechanism, by which the record of the collections of mail-matter is obtained, is constructed and operates as follows:

Secured to the back plate 5 is a clock-movement 7 of the usual type, on the spindle 8 of which is rigidly mounted a tape-feeding roller 9, and in yielding contact therewith is an idler-roller 10, mounted upon a movable spring-controlled arm 11. The roller 9 is provided on its periphery with a number of pointed teeth 12, and in the periphery of the roller 10 is a corresponding depression or groove 13, and by reason of these teeth and the depression or groove a record-tape 14, interposed between said rollers, is caused to be positively fed in the direction of the record mechanism. The tape 14 may be supplied to the rollers in any suitable manner—such, for instance, as from the roll 15, (shown)—which may contain any desired length and which is arranged to revolve on a spindle, a tension-finger 16 being employed to exert a sufficient pressure on the tape to insure it being kept reasonably taut. This tape is fed continuously by the clock-impelled rollers and has previously printed or otherwise placed thereon division-marks denoting fractions of time, the number of division-marks in a certain length of tape corresponding to so many hours and minutes, as will be understood by reference to Fig. 10, which is an enlarged view of a section of the tape.

The tape, as before stated, is fed by the clock-movement, but the mechanism for recording, by means of the tape, the time of a collection is operated only through the manipulation of the letter-box door. The time of a collection of mail-matter may be recorded on the tape in a number of ways. The tape may be impressed by an inked stamp, may be perforated by a die, or, if desired, portions of the tape may be severed at the recording operations. In each instance, however, the impression or where the tape is severed the cut will indicate the exact time of the day or night the collection has taken place, as the tape is fed with the same accuracy as exists in the movement of the hands of a clock.

It is preferable that a perforating-die be employed as the recording means and that the exposed or impressed portion of the tape be removed from the device only when the records for a day are completed or when the portion has assumed a convenient length. The tape is the check on the carrier, and with the last collection, or, if desired, with each collection, the carrier gains possession of the impressed portion by operating a knife $16^a$, which is depressed by a pull on a knife-actuating arm $16^b$, and thus severs that portion of the tape which contains the record. He then deposits the impressed portion of the tape at the office, where it is proof of good service or neglect, as the case may be. The employment of the perforating-die is also preferable, in that it complicates any attempt on the part of the carrier to alter the record to cover neglect or delays in collections.

I have in the drawings shown a perforating-die, the same being numbered 17, and, as shown in Fig. 10, the perforations made by the die in the tape are preferably in a transverse line. The male portion of the die is removably secured to an arm 18, connected to a rock-shaft 19, journaled in suitable bearings, and 20 is a spring coiled around said rock-shaft and operating to normally raise the die to its inactive position. The arm 18 is extended beyond the connection with the rock-shaft, the extension being numbered 21. The female portion of the die is at the end of a plate 22, over which the tape passes as it comes from the feeding-rollers, and at 23 is an opening in an inner casing 24, through which the perforated portion of the tape projects. It is also preferable to employ in connection with the perforating device an impressing-stamp, which is operated with the perforating device to imprint adjacent to the line of perforations a number corresponding to the number of the box or receptacle.

The actuating-lever previously mentioned is numbered 25. To one end thereof is pivotally secured the rod 4, which, by its movement, imparted by the manipulation of the letter-box door, causes said lever to swing on its pivotal point and to cause its other end to engage the extension 21 of the arm 18. This latter end, which is numbered 26, is cam-shaped, and by its engagement with the extension 21 the arm 18 is moved against the action of the spring and the male die carried thereby is brought into coöperation with the female die to perforate the interposed tape. As soon as the die has operated it is retracted by the action of the spring, the cam 26 being so shaped as that only the minimum of time elapses during its engagement with the arm, as otherwise the feeding of the tape and the movement of the clock mechanism might be retarded.

The pivotal point of the actuating-lever 25 is adjacent to and directly in line with the mainspring-spindle, but is unattached to the clock mechanisms. The movement of this lever is employed to wind the mainspring, the intermediate mechanism being preferably as follows: On the spindle is rigidly secured a ratchet-wheel 27, a portion of the periphery of which is mutilated and extended beyond the line of the teeth to form a cam 28. Rigid with this wheel is a disk 29, provided with an annular flange 30, which is partially cut away adjacent to the cam 28. One end 31 of this flange is unattached to the disk and is resilient, and the other end 32 is partially cut away, and these flange ends are so disposed with relation to the cam 28 as to provide a small opening at each side of the cam for a purpose to be presently explained.

On the lever 25 is pivotally secured a spring-controlled pawl 33, which is caused to engage the ratchet-wheel during the movement of the lever and to thereby wind the mainspring, but which is disengaged therefrom when the lever is at rest by its contact with a stop-screw 34, located in the path of the arm 35 of said pawl. The disengagement of the pawl from the ratchet-wheel when the lever is inactive obviously permits the continued operation of the clock mechanism, as otherwise the pawl would act as a stop to the movement. At each movement of the lever the mainspring is partially wound, and when the said spring is reasonably tight the pawl is rendered idle in the following manner: On the engaging end of the pawl is a pin 36, which normally occupies a position within the flange 30, but which, in the event of the spring being tight, has its position without the said flange, its entrance and exit being through the opening therein between the ends 31 and 32 and the cam 28. The clock mechanism is so adjusted as that one complete revolution of the mainspring-wheel will accomplish the winding of the spring, and when the spring is tight the opening comes opposite to the pawl, when the pin rides between the loose spring end 31 of the flange and the cam 28, forcing said end outward until passed, when the resilient action of the end restores its position, and on the reverse movement of the disk and wheel the pin rides over or is without the flange, and the pawl is thus disengaged from the ratchet-wheel until the next complete revolution of the latter, when, the opening being again opposite the pawl, its engaging end and the pin can drop through the opening between the cam and the flange end 31 and assume its position within said flange, where it will engage the ratchet-wheel to rewind the spring with the next movement of the lever 25. By this mechanism provision is made against retarding or stopping the clock mechanism, as the pawl is caused to engage the ratchet-wheel only when the lever is moved and when the spring is unwound or but partially wound, the pawl being disengaged by the stop-screw 34 when the lever is idle and by the engagement of the flange and pin when the spring is wound to its capacity.

The automatic rewinding of the clock mechanism may be effected in other ways, and in some instances I may dispense with the automatic means by employing an eight-day-clock movement, which will be key-wound at intervals of eight days.

The tape, as before stated, is fed through an opening 23, formed in an inner casing 24. Access to this exposed portion of the tape and to the knife-arm 16$^b$ is permitted by the opening of a door 37 in the cap or cover 6, said door being hinged at one side and provided with a spring-controlled self-locking latch 38. This door is unlocked by the retraction of the latch 38, which is accomplished by the movement of the lever 25 through an arm 39, carried thereby, which arm engages and moves the latch a sufficient distance to free the door and permit of its opening. The inner casing 24 protects the mechanism from malicious derangement, as without it the parts would be exposed upon the opening of the door 37.

By reference to Fig. 1 it will be noted that the times of collection are conspicuously displayed, the means employed including a time-indicator, a portion of which is exposed through a slot in the cap or cover 6. The mechanism for shifting said indicator to make the change of time is actuated by the movement of the lever 25, the result being that coincidently with the opening of the letter-box the dial is shifted to expose through the slot the time of the next following collection. The indicator is numbered 40, and consists, preferably, of a disk having thereon the times of collections for a day arranged in a circular line, said times being successively displayed through the slot 41 in the cap or cover 6. The times of collection are preferably imprinted on the dial in a luminous medium to be visible at night. The said dial is pivotally mounted on a frame or support 42, which latter is removable when desired for the purpose of giving ready access to the other parts of the device—such, for instance, as the tape-feeding mechanism—for renewals of tape. Fixedly secured to the dial is a ratchet-wheel 43, the teeth of which are spaced to correspond with the divisions of time on the dial, and this wheel and dial are caused to move a distance equal to the space between two teeth, or one division of time, by the action of a pawl 44, carried by a rock-arm 45, which latter is moved by engagement with the lever 25. The arm 45 is pivoted at 46, and its upper end is bent at right angles to afford a support for the pawl 44. The engaging end of this pawl is a pin or finger 47, which is in the path of the teeth of the ratchet-wheel 43, and said pin or finger is kept in contact with the ratchet-wheel periphery by the action of a spring 48. The rock-arm 45 is provided with a spring 49, which restores said arm to its normal position after its movement by the lever 25. To prevent backward movement of the dial, a spring-actuated stop-pawl 50 is employed, which has a pin or finger 51 engaging the teeth of the ratchet-wheel 43. On Sundays and holidays the times of collection vary from those of week and work days, and I provide a second dial similar in construction to the dial 40, but having thereon the times of collection which occur on the exceptional days mentioned. This second or Sunday dial is numbered 52 and is arranged in front of the dial 40, its spindle 53 passing through the hollow spindle which connects the dial 40 with its ratchet-wheel 43, and on the inner end of the spindle 53 is secured a second ratchet-wheel 54. The times for collection of mail-matter on Sundays and holidays are less frequent than on week-days, and hence only a portion of the dial 52 is occupied with the times of collection, the unoccupied portion being cut away, so that the times on the dial 40 may be exposed during week-days. The ratchet-wheel 54, through which the Sunday dial is operated, has on a portion of its periphery a number of teeth corresponding to the number of times of collection on said dial, and said toothed portion is of greater diameter than the ratchet-wheel 54 and is adapted to be engaged and moved by the pawl 44 in a manner similar to the said week-day ratchet-wheel. The remaining portion of the periphery of the ratchet-wheel 54 is without teeth and has a diameter slightly less than the diameter of the wheel 40, which allows of the operation of the latter by the pawl 44 during the week-days.

On the spindle 53 is a coiled spring 55, which operates to restore the normal position of the Sunday dial and its wheel 54, the normal position being illustrated in Fig. 2, wherein the first Sunday-collection hour is shown adjacent to the slot in the casing and the first ratchet-tooth adjacent to the pawl 44, a projection 56 on the under side of the ratchet-wheel engaging a stop 57 on the clock-movement frame to effect this position of the parts. To bring the Sunday dial into operation, I employ a pivoted arm 58, which has one end projecting through a slot in the inner casing to permit of its movement by the carrier or collector, or, if desired, said movement is accomplished automatically by any suitable connection. The other end of this arm 58 is in the path of the engaging end of the pawl 44, as shown, and when said end is depressed by lifting the other end of the arm said pawl is disengaged from the ratchet-wheel 40 and brought into the path of the teeth of wheel 54, with the result that the latter wheel is operated at each movement of the box-door on Sundays or holidays. On the inner end of the arm 58 is a spring-controlled stop-pawl 59, which, when said arm is depressed, is brought into the path of a number of ratchet-teeth 60, radially disposed on the under side of the ratchet-wheel 54. These teeth 60 are of such a length that the engagement thereof with the pawl 59 is effected only when the arm is moved to depress the inner end, and on the restoration of said arm to its normal position said pawl is carried beyond the path of the teeth to allow the action of the coiled spring 55 to restore the normal idle position of the Sunday dial.

With the parts in the position shown in Fig. 2 the week-day dial is operated at each movement of the box-door, and when said door is opened for the last Saturday collection the arm is moved to disengage the pawl 44 from the wheel 40 to bring said pawl in position for operating the wheel 54 and also to bring the stop-pawl 59 into position for engagement with the under ratchet-teeth 60. The Sunday dial is thus moved at each manipulation of the box-door against the action of the spring and held at each partial rotation by the action of the stop-pawl 59. The Sunday dial is rendered idle and the week-day dial brought in action by the reverse movement of the arm 58.

The operation is follows: The clock mechanism is presumed to have been wound to its full capacity and is consequently in operation, feeding the time-tape constantly in the direction of the impressing device. When the letter-box door is opened for collection, the impressing device is brought into action through the action of the lever 25 and the rod connection with the door, and the tape is impressed in any one of the ways heretofore described, but preferably by a transverse line of perforations and with the number of the box. The tape, as before stated, has conspicuously thereon marks denoting divisions of time, and the exact time of the operation of opening the door is therefore easily determined by the position of the impression relative to said marks. The time for the collection is, say, 8.45 a. m., as indicated by the dial, and should the impression be found at a division indicating the hour of nine it will be proof positive that the collection was delayed fifteen minutes. It is preferable that the impressed portion of tape be secured at the time of the last collection, as the portion will then have a convenient length and less labor will be necessary in accounting the results than if a portion of the tape was secured at each collection. In the preferred plan the strip of tape is severed by the knife 16ª at the last line of perforations and represents a record of the entire number of collections for the day. Access to the strip of tape and to the knife-arm 16ᵇ is given through the door 37, which is opened by the movement of the letter-box door through the arm 39 on the lever 25. The opening of the letter-box door operates also, through the lever 25, the arm 45, and pawl-and-ratchet connection, the dial 40 and moves the latter a sufficient distance to expose through the slot in the cap or cover the time of the next following collection—say "9.30 a. m."—and this may be done upon the opening or the closing movement of the letter-box, as preferred. The mainspring of the movement being wound to its full capacity, as stated, the winding mechanism is idle upon the movement of the letter-box door, the pin 36 on the pawl 33 being without the flange, and consequently holding said pawl from engagement with the ratchet-wheel. When the mainspring-spindle and the ratchet-wheel and flanged disk have made a complete revolution, the opening in the flange is brought opposite to the pin 36 and the latter drops thereby within the flange and the pawl is in position to engage the ratchet-wheel upon the movement of the lever 25, the pawl, however, being disengaged from the wheel when the lever is idle through contact with the stop-screw 34. As the lever is moved by the manipulation of the letter-box door the spring is partially wound, and in this way the clock mechanism is kept constantly in operation, as the mechanism is so adjusted as that the mainspring cannot unwind sufficiently to stop the movement during the greatest interval of time between the collections.

Aside from the advantages hereinbefore set forth the device is capable of great accuracy, which is not impaired by the movement of the letter-box door, no matter how violent. The impression device, the winding mechanism, and the means for moving the dial to indicate the times for collection are practically separated from the clock mechanism, and the latter is subjected to no strain by the improper manipulation of the door.

Aside from the accuracy of the device its construction is on the lines of great durability, there being comparatively few parts and no complicated features.

The cost of constructing and applying the device is comparatively small, and its use will result in economy, as the services of an inspector may be dispensed with and many other of the present safeguards now employed will be unnecessary, owing to the fact that certain proof of neglect of duty is available at all times, as before explained.

As previously stated, my invention is susceptible of application to registering devices generally—such, for instance, as time-recorders for workmen, watchmen, and other employees—and may also be embodied in devices for recording acts other than the collections of mail-matter, such as the opening and closing of house, safe, and other doors, and in devices for many other purposes.

My invention is also susceptible of being operated in connection with other recording devices, such as electric or other annunciators or recorders, it being evident that when applied to a letter-box or other mail-matter receptacle, for instance, electrical connections can be made between it and an annunciator or recorder at the office with a dual record and check on the collector as a result.

With my invention also can be fitted an alarm, such as a bell, which is sounded through manipulation of the device in any suitable manner.

What I claim is—

1. The combination with the door of a letter-box, or other mail-matter receptacle, of an indicator having noted thereon the stated times for the collection of the mail, means for opening said door, means adapted to be actuated by the latter and for actuating said indicator, a recording device, means controlled by the movement of said door for actuating said recording device and an automatically-operated tape-feeding device, substantially as set forth.

2. The combination with the door of a letter-box or other mail-matter receptacle, of means controlled by the movement of the door for operating a recording device, and an automatically-operated tape-feeding device, substantially as described.

3. The combination, with the door of a letter-box, or other mail-matter receptacle, of a recording device, means controlled by the movement of said door for actuating said recording device, a tape-feeding device and a clock mechanism for actuating said tape-feeding device, substantially as specified.

4. The combination, with the door of a letter-box, or other mail-matter receptacle, of a recording device, means controlled by the movement of said door for actuating said recording device, a tape-feeding device, a clock mechanism for actuating said tape-feeding device and a means for winding said clock mechanism adapted to be simultaneously operated with the actuation of said door, substantially as set forth.

5. In a recording device for letter-boxes or other mail-matter receptacles, the combination with the letter-box or other receptacle door, of a tape-marking device operated by the movement of the door, and a clock mechanism having feed-rollers for moving the tape to the marking device.

6. In a recording device for letter-boxes or other mail-matter receptacles, the combination with the door of said box or receptacle, of a tape-marking device operated by the movement of the door, a clock mechanism having feed-rollers for moving the tape to the marking device, and means for winding the clock mechanism operated by the movement of the door.

7. The combination in winding mechanism for clockwork-mainsprings, of a mutilated ratchet-wheel rigid with the mainspring-spindle, a flange concentric with said ratchet-wheel and having an opening adjacent to the mutilation, and a winding-pawl carrying a pin, said pin coöperating with the flange in the manner and for the purpose set forth.

8. The combination in winding mechanism for clockwork-mainsprings of a ratchet-wheel rigid on the mainspring-spindle having on its periphery a cam, a flange concentric with the wheel and having an opening adjacent to said cam, one end of the flange being unattached and resilient, and a winding-pawl having a pin adapted to coöperate with the flange in the manner and for the purpose set forth.

9. The combination with the mainspring, the mutilated ratchet-wheel, and the flange having the opening, of the winding-pawl, and a device on the pawl adapted to coöperate with the opening of the flange at each complete revolution of the ratchet-wheel in the manner and for the purpose set forth.

10. The combination with the mainspring of a clock mechanism, of a winding-lever having pawl and ratchet-wheel connection with the mainspring-spindle, and means for preventing overwinding of the mainspring consisting of a cam on the ratchet-wheel, a flange concentric with said wheel and having an opening opposite said cam, and a pin on the pawl coöperating with such flange in the manner substantially as described.

11. In a recording device for letter-boxes and the like, the combination of a clock mechanism tape-feeding device, a tape-marking device, means controlled by the movement of the letter-box door for actuating said marking device, and a knife arranged and adapted to cut the tape after marking substantially as described.

12. In a registering device the combination with a clock mechanism adapted to continuously feed a time-tape, a device for impressing said tape, means for winding the clock mechanism, and a lever 25 adapted to simultaneously operate said impressing device and winding means, substantially as described.

13. In a registering device for letter-boxes or mail-matter receptacles, the combination with a lever 25 provided at one end with a cam, and adapted to be moved by the manipulation of the door of the box or receptacle, a device for impressing said time-tape carried by an arm adapted to be actuated by the said cam, a clock mechanism for moving said tape, and a pawl and ratchet-wheel connection between the mainspring and the said lever whereby the movement of the said lever winds said mainspring.

14. In a letter-box register, an indicator for denoting the times for collection, a clock mechanism for feeding a time-tape, and a tape-marking device, and means for controlling said indicator, for winding said clock mechanism and for operating said impressing device, substantially as described.

15. A letter-box register adapted for attachment to the exterior of the letter-box, comprising a tape-feeding mechanism, and a tape-impressing device, and a connection between said device and the door of the letter-box operating to actuate said device upon the movement of the door, substantially as described.

16. A letter-box or other mail-matter receptacle indicator comprising in combination a week-day dial and a Sunday or holiday dial, a ratchet-wheel connected with the week-day dial and a mutilated ratchet-wheel connected with the Sunday dial, stop-pawls for said ratchet-wheels, an arm adapted to be moved by the opening of the receptacle-door carrying a pawl and means for bringing said pawl into engagement with either ratchet-wheel, substantially as described.

17. A letter-box or other mail-matter receptacle indicator comprising in combination a week-day dial and a Sunday or holiday dial, a ratchet-wheel connected with the week-day dial and having a stop-pawl, a ratchet-wheel connected with the other dial and having on a portion of its periphery teeth corresponding in number to the times of collection on the said Sunday dial, and having a number of teeth on its under side concentrically disposed, an arm adapted to be moved by the manipulation of the receptacle-door carrying a pawl, and means for bringing said pawl into engagement with either ratchet-wheel consisting of a pivoted arm in the path of the pawl and provided at its inner end with a stop-pawl for engagement with the teeth on the under side of the ratchet-wheel, said arm, when moved, operating in the manner and for the purpose substantially as described.

In testimony whereof I affix my signature in presence of two witnesses.

THOMAS J. HOUCK.

Witnesses:
W. I. NORTON,
ARTHUR BROWNING.